UNITED STATES PATENT OFFICE.

WILLIAM H. SANTEN, OF CINCINNATI, OHIO.

PLASTIC COMPOSITION.

1,402,969.  Specification of Letters Patent.  Patented Jan. 10, 1922.

No Drawing.  Application filed February 24, 1920. Serial No. 360,964.

*To all whom it may concern:*

Be it known that I, WILLIAM H. SANTEN, a citizen of the United States, residing at Cincinnati, in the county of Hamilton and State of Ohio, have invented certain new and useful Improvements in Plastic Composition, of which the following is a specification.

It is the object of my invention to provide a new composition of matter comprising pyroxylin pulp, ingredients to reduce its explosiveness and to render the same plastic, and an ingredient to increase its elasticity, and, further, to clarify the same by mastication. It is the object of my invention further to produce a new and useful article of manufacture containing ingredients of the character stated and having the property of being malleable, so as to be capable of being shaped or formed, for instance by pressure between rollers so as to produce sheets of various thicknesses, of being drawn, for instance to produce rods of various sizes, or of being rolled, creased or otherwise formed, of being molded, or of being shaped into various forms and configurations by pressure, the article having the further property of setting into the various sheets, forms, rods or configurations; further to provide a new article which is capable of being made plastic or malleable when in presence of heat, so as to be capable of manipulation into various forms and configurations and changes of thickness and cross sectional forms and dimensions, the form of the article being fixed upon cooling; further, to produce a new composition of matter having the respective properties hereinbefore mentioned.

The principal ingredients of my improved article of manufacture and composition of matter which I prefer to employ are pyroxylin and polymerized oil, preferably polymerized tung oil. Other ingredients are preferably camphor, rosin and naphthalene, or such of the same or other ingredients which may be desired, to aid reducing explosiveness and rendering the mixture plastic.

The proportion of the ingredients mentioned which I prefer to employ are pyroxylin, sixty per cent; camphor, fifteen per cent; rosin, five per cent; naphthalene, ten per cent; polymerized tung oil, ten per cent, the percentages being based on weight. I prefer these as proportions, but it is obvious that the proportions may be varied from those recommended, while producing an article or composition having substantially the properties above mentioned, without departing from the spirit of my invention.

The pyroxylin employed is thoroughly comminuted in water into a fine pulp in which the pyroxylin is finely divided, and the pulp is then dehydrated.

The pyroxylin employed is commercial pyroxylin, and it is desirable that the pyroxylin employed shall be completely soluble in ether denatured ethyl alcohol, as the more soluble it is in this substance, the clearer will be the product.

The camphor employed is that which is known in the trade as Japanese camphor of refined grade.

The naphthalene employed is the refined product.

The rosin employed is preferably of the lightest color obtainable to aid in producing a light and transparent product.

The desired amount of camphor, naphthalene and rosin are preferably dissolved in thirty per cent of their total weight of alcohol, preferably ether denatured ethyl alcohol, and introduced into the mixture as a solvent. The solution of camphor, napthalene and rosin acts as a solvent for the pyroxylin pulp, and to reduce explosiveness of the latter and aid in rendering the same plastic. Other suitable solvents may be employed.

When prepared under advantageous circumstances and in proper proportions, the resultant product is transparent, but whether transparent or otherwise, it may be colored in desirable manner by the introduction of a suitable color or color-ingredients.

The color ingredient or dye stuffs preferably employed, are basic or acid dye stuffs which when pure readily dissolve in methyl or ethyl alcohol without any precipitate, and are added in alcoholic solution preferably at the same time with the alcoholic solution of camphor, naphthalene and rosin, but they may be added to the comminuted pyroxylin or the polymerized tung oil.

Tung oil consists chiefly of the glycerides of oleic and elaromargaric acid. The tung oil employed is of the ordinary grade now on the market and is commonly known as Chinese or Japanese wood oil and is an oil extracted from the seeds of the tung yu tree, a native of China and Japan.

Polymerization of the tung oil is preferably effected by heating the tung oil to a temperature of 250° to 260° centigrade for from 30 to 40 minutes, under exclusion of air, for instance, in a closed vessel, whereby it becomes a jelly-like mass. The polymerization is completed by cooling under exposure to air, for instance in a room of ordinary temperature of 70° Fahrenheit. The mass thereby substantially solidifies. The polymerized tung oil possesses a marked degree of elasticity. The polymerization may be effected in other ways, although I prefer the manner stated.

The polymerized tung oil imparts additional elasticity as well as increases the tensile strength or tenaciousness of the product.

The product is preferably produced by performing the following steps namely; 1, thoroughly comminuting the pyroxylin, and dehydrating the same; 2, preparation of the camphor, naphthalene and rosin as a latent solvent, to form a solvent of the comminuted pyroxylin; 3, preparation of the dye stuff or color or color ingredients, if coloring matter is employed; 4, polymerization of the tung oil; 5, mixing the comminuted pyroxylin, the prepared camphor, naphthalene and rosin, the prepared coloring matter and, when desired, and the polymerized tung oil; 6, conversion of the mixture into a plastic by masticating with pressure in the presence of heat; 7, seasoning, or eliminating the excess of fluidity of the solvents; 8, cutting, molding or pressing into suitable form; 9, hardening the formed product; to which steps may be added, if desired; 10, rendering the product plastic or malleable after the same has become hardened; 11, re-forming the same, and, 12, hardening the formed product. The order of the steps may be varied.

The comminuting of the pyroxylin is preferably accomplished by means of a machine similar to that used in the grinding of paper pulp. It is important that the comminution shall be thorough. The comminution or grinding takes place under water.

The dehydration of the pyroxylin pulp is preferably effected by means of a hydro-extractor of centrifugal type, by means of which the bulk of the water is removed. The pulp is then placed in a hydraulic press similar to that now used in the nitro-cellulose industry. The dehydrated pyroxylin pulp is employed in the composition.

The prepared pyroxylin, the camphor, naphthalene and rosin solvents, the coloring matter when employed, as well as the polymerized tung oil, are brought together preferably in small quantities and thoroughly kneaded, preferably in a kneading machine, to reduce the mixture to plastic condition. To effect this the prepared proxylin is fed through a measuring machine to a suitable chute, which is arranged so that its lower end may be raised or lowered to regulate the quantity of the prepared pyroxylin discharged by it. A sprinkler is provided immediately below the inlet to the kneading machine. The sprinkler may consist of a tube provided lengthwise with a number of perforations directed downwardly in the direction of the falling prepared pyroxylin, the alcoholic solution of camphor, naphthalene and rosin being fed through this tube and perforations into contact with the prepared pyroxylin is fed through a measuring machine to a suitable chute, which is arranged so that its lower end may be raised or lowered to regulate the quantity of the prepared pyroxylin discharged by it. A sprinkler is provided immediately below the inlet to the kneading machine. The sprinkler may consist of a tube provided lengthwise with a number of perforations directed downwardly in the direction of the falling prepared pyroxylin, the alcoholic solution of camphor, naphthalene and rosin being fed through this tube and perforations into contact with the prepared pyroxylin being fed.

A similar sprinkler is employed for feeding the polymerized tung oil, which is preferably added to the prepared pyroxylin pulp, preferably during polymerizing at not exceeding 120° C., at or about the same time with the alcoholic solution of camphor, naphthalene and rosin.

The coloring matter may be added to the mixture by a similar sprinkler or be introduced at another desirable point.

The kneading of the mixture is continued for a period of about two hours. The mixture is then allowed to stand for from six to eight hours, during which penetration of the alcoholic solutions throughout the mass continues. The mass is then again kneaded for a period of approximately one hour, after which the mass is again allowed to stand for a period of six hours or longer, the desired length of this period being determined by the milky glazed appearance which is assumed by the mass when proper impregnation has been had. The kneading operation is preferably accomplished at, and the standing periods preferably take place during, ordinary atmospheric temperatures, at approximately 70° Fahrenheit.

The conversion of the mass into a plastic by means of heat and pressure and clarifying the same, is preferably continued by passing the mass, after it is received from the kneaders or kneading machine, between masticating rollers, the mass being passed repeatedly between the rollers for subjecting the mass to masticating pressures. These pressures may be approximately 100 to 125 pounds per square inch for a period of approximately thirty to fifty minutes. Greater or less pressures may be employed, the greater pressures accelerating the operation. The longer the masticating process continues the more nearly transparent does the plastic become.

I prefer to supply the heat desired by employing hollow rollers as masticating rollers, the rollers being heated by introducing steam into the hollow of the rollers for maintaining the rollers at temperatures of approximately fifty degrees to sixty degrees centigrade. Suitable arrangements are provided for controlling the heat and for introducing a cooling liquid into the interior of the rollers, for instance, cooling water in addition to or in place of the steam, if the heat should become excessive, and for the purpose of maintaining the rollers at a uniform temperature.

The step of polymerizing the tung oil is advantageously utilized by making the polymerized tung oil afresh for each batch or operation, for the reason that if the polymerizing tung oil is introduced in to the mixture during polymerizing, after being heated for the period above mentioned under exclusion of air, and after having been permitted to cool to 120° C. or lower, the polymerization by exposure to air continues to completion in the mixture coincident with the conversion of the mixture into a plastic, so as to better utilize the elastic properties of the polymerized oil in adding tensile strength to the product.

When the mixture has been thoroughly masticated to form a plastic it is preferably placed in trays, preferably in thin layers, so as to expose a maximum surface to the air for seasoning the same and substantially eliminating the alcohol solvent. The layers may for instance be one-fourth inch thick.

The layers in their trays are preferably placed in rooms which are lined with zinc or tin and so arranged as to provide for free and thorough circulation of air over the trays. The temperature of the drying rooms in which the drying is effected is maintained day and night at approximately fifty degrees centigrade. The drying continues for about six to ten days for layers of about one-fourth inch thickness. The drying eliminates the ether denatured alcohol or similar ingredients of the product to the desired extent. The drying is considered complete when the interior of the layer has lost a peculiar lardaceous appearance, this lardaceous appearance being indicative of the presence of traces of the alcohol.

The mass is now still in plastic condition but is ready to be cut or shaved into sheets of desired sizes, or forced into tubes by means of a suitable stuffing machine, or molded into suitable forms.

The product in course of time will, by evaporation, or on exposure to atmosphere, become malleable and then hard. It may however, be reconverted into malleable state or into a plastic by subjecting the same to heat, for instance, the heat of a heated liquid of approximately 80 to 100° centigrade, in which the product has been immersed for a period of five to ten minutes, or by other means. This renders the product again malleable or plastic, depending on the degree of heat and its duration of application, so that the same may be rolled, molded, stretched or pressed for assuming different desired formations, thicknesses, cross-sectional shapes, or the like, as may be desired.

After the product has been reconverted into malleable state or into a plastic, it again becomes hard very quickly, becoming hard or set upon cooling, and the cooling may if desired be accellerated by suitable means, as by a cooling current. The product may therefore be punched or pressed while malelable and be quickly set in pressed condition.

The softening, as by heat, may take place until the composition again becomes malleable or plastic to the degree desired according to the manipulation intended. For instance, if malleability is desired sufficiently only to roll or reform the material, the degree and duration of application of the heat will be less than if it is desired to render the material readily plastic for forcing into tubes or pressing into molds.

The heating of the product preferably does not exceed 120° C., as at this temperature the camphor is liable to distill off.

The product retains its capacity for being rendered plastic or malleable for a long period of time and approximately indefinitely.

The product may be rolled into extremely thin sheets while in malleable condition. The edges of the rolled sheet or sheets may be suitably trimmed by cutting, the edges of the sheets may be folded and subjected to pressure for maintaining the folded portions in folded relation, the sheets may be formed into intaglio and relief shapes, which the product maintains upon hardening. It may be punched, pressed and formed similarly to sheet metal. The sheets may be printed by usual printing methods.

The product is a non-conductor of electricity and is applicable for insulating purposes.

The product can be mixed in suitable proportions as ingredients in lacquer or varnishes for preventing the latter acquiring milkey colors when moistened.

The product may also be converted into a solution by stirring in those solvents of the product which are not injurious to fabric, as acetone, ethyl acetate, or methyl acetate, and applied by means of rollers to render fabric or paper water proof.

Among the properties of the product it may be stated that the product is transparent, when prepared with or without coloring ingredients under best conditions and with the most desirable ingredients, and retains this property on exposure to light and air; it is elastic when hardened; and while it is inflammable, it is not as inflammable as ordinary celluloid, and it burns much less rapidly than celluloid.

The tensile strength of the product is much greater than that of ordinary celluloid.

When properly prepared there is little or no danger of its being exploded by heat friction or percussion.

The product decomposes at approximately one hundred and sixty degrees centigrade, and ignites at approximately four hundred and fifty to four hundred and eighty degrees centigrade.

The product is soluble in concentrated and dilute acetic acid, in acetone, amyl acetate, methyl acetate, ethyl acetate, and the higher ketones; in hot concentrated solutions of sodium hydroxide, potassium hydroxide and in alcoholic solutions of camphor, naphthalene and acetanilid.

The ash of the product is below one per cent and its specific gravity is about 1.35.

While I have named certain properties possessed by the product when prepared under most favorable conditions and with most desirable ingredients, it is to be understood that all the properties named need not be present in my improved product or composition of matter or in the product of my improved method, but that variations therefrom and from the ingredients, proportions, temperatures, treatments and steps of the method advised, may be present, within the spirit of my invention or as claimed in the appended claims.

Having thus fully described my invention, what I claim as new and desire to secure by Letters Patent, is:

1. A composition of matter comprising pyroxylin, camphor and polymerized tung oil.

2. A composition of matter comprising pyroxylin pulp, an ingredient to render the pyroxylin pulp non-explosive and plastic, coloring matter and polymerized tung oil.

3. A composition of matter comprising pyroxylin, camphor, naphthalene, rosin and polymerized tung oil.

4. A composition of matter comprising pyroxylin, camphor, naphthalene, rosin, and polymerized tung oil, in substantially the proportions described.

5. A composition of matter comprising pyroxylin pulp, alcoholic solution of camphor, naphthalene and rosin sufficient to dissolve the pyroxylin pulp, and polymerized tung oil sufficient to stiffen the mixture.

6. A masticated plastic composition of matter comprising pyroxylin pulp, alcoholic solution of camphor, naphthalene and rosin, and polymerized tung oil adapted to become a malleable substance and to become hard on exposure to air.

7. A masticated plastic composition of matter comprising pyroxylin pulp, alcoholic solution of camphor, naphthalene and rosin, and polymerized tung oil, adapted to become a malleable substance and to become hard on exposure to air, and capable of being re-rendered malleable by subjecting the same to heat.

8. A composition of matter comprising by weight substantially sixty per cent of pyroxylin pulp, fifteen per cent of camphor, five per cent of rosin, and ten per cent of naphthalene, the said camphor, rosin and naphthalene dissolved in substantially thirty per cent of their weight in ether denatured ethyl alcohol, and ten per cent of polymerized tung oil.

9. A composition of matter comprising by weight substantially sixty per cent of pyroxylin pulp, fifteen per cent of camphor, five per cent of rosin, ten per cent of naphthalene, all dissolved, and ten per cent of polymerized tung oil.

10. A composition of matter comprising pyroxylin pulp, ether denatured ethyl alcohol solution of camphor, rosin, and naphthalene, and polymerized tung oil.

11. A composition of matter comprising pyroxylin pulp, ether denatured ethyl alcohol solution of camphor, rosin and naphthalene, and polymerized tung oil, reduced to plastic condition, and adapted to harden by evaporation of the ether denatured ethyl alcohol of the solution.

12. An article of manufacture comprising pyroxylin pulp, ingredients to reduce the explosive properties of the pyroxylin pulp, and to render the same plastic, and polymerized oil, capable of being rendered malleable by subjection to heat.

In testimony whereof, I have hereunto signed my name in the presence of two subscribing witnesses.

WILLIAM H. SANTEN.

Witnesses:
CLARENCE A. DORGER,
COLON SCHOTT.